United States Patent [19]
Krishna et al.

[11] Patent Number: 5,894,559
[45] Date of Patent: Apr. 13, 1999

[54] SYSTEM FOR SELECTIVELY REDUCING CAPTURE EFFECT IN A NETWORK STATION BY INCREASING DELAY TIME AFTER A PREDETERMINED NUMBER OF CONSECUTIVE SUCCESSFUL TRANSMISSIONS

[75] Inventors: Gopal Krishna, San Jose; Mohan Kalkunte, Sunnyvale, both of Calif.

[73] Assignee: Advanced Micro Devices, Inc., Sunnyvale, Calif.

[21] Appl. No.: 08/698,102

[22] Filed: Aug. 15, 1996

[51] Int. Cl.$^6$ ................................................ G06F 13/00
[52] U.S. Cl. .................... 395/200.83; 395/856; 370/448
[58] Field of Search .................... 370/445, 448, 370/230, 447; 340/825.5; 395/200.55, 200.58, 200.62, 200.83, 856

[56] References Cited

U.S. PATENT DOCUMENTS

| | | | |
|---|---|---|---|
| 5,319,641 | 6/1994 | Fridrich et al. | 370/447 |
| 5,353,287 | 10/1994 | Kuddes et al. | 370/448 |
| 5,404,353 | 4/1995 | Ben-Michael et al. | 370/235 |
| 5,418,784 | 5/1995 | Ramakrishnan et al. | 370/445 |
| 5,422,887 | 6/1995 | Diepstraten et al. | 370/448 |
| 5,436,903 | 7/1995 | Yang et al. | 370/448 |
| 5,526,355 | 6/1996 | Yang et al. | 370/488 |
| 5,642,360 | 6/1997 | Trainin | 370/230 |

FOREIGN PATENT DOCUMENTS

| | | |
|---|---|---|
| 0632619 A2 | 4/1995 | European Pat. Off. . |
| 0632620 A2 | 4/1995 | European Pat. Off. . |
| 0632621 A2 | 4/1995 | European Pat. Off. . |

OTHER PUBLICATIONS

Comer, D.E., et al., "A Rate–Congested Avoidance and Control Scheme for Packet Switched Networks," Proceedings of the International Conference on Distributed Computin Systems, Paris, May 28–Jun. 1, 1990, Conf. 10, May 28, 1990, IEEE, pp. 390–397.

Williamson, C.L., et al., "Loss–Load Curves: Support for Rate–Based Congestion Control in High–Speed Datagram Networks," Proceedings of the Conference on Communications Architectures and Protocols (SIGCOMM), Zurich, Sep. 3–6, 1996, vol. 21, No. 4, Sep. 3, 1991, Association for Computing Machinery, pp. 17–28.

Pouzin, Louis, "Methods, Tools, and Observations on Flow Control in Packet–Switched Data Networks," IEEE Trans. on Communications, vol. 29, No. 4, Apr. 1981, New York, pp. 413–426.

Gerla, M. et al., "Congestion Control in Interconnected LANS," IEEE Network, vol. 2, No. 1, Jan. 2, 1988, New York, pp. 72–76.

AMD, AM79C970 PCnet™–PCI Single–Chip Ethernet Controller for PCI Local Bus, Jun. 1994, pp. 1–868— 1–1033.

*Primary Examiner*—Le Hien Luu

[57] ABSTRACT

Delay times are modified in an Ethernet network device having captured the media channel by increasing the interframe spacing (IFS) between data packets. The modified IFS interval, increased by adding a delay interval to the minimum interpacket gap (IPG) interval after a predetermined number of consecutive successful transmissions, enables other network stations to transmit data during the deferral interval. The Ethernet network device maintains the modified IFS for a limited deferral interval, based upon a predetermined time interval or a number of successful transmissions by other network stations. Additional delay intervals may be added if the network station continues to exceed the predetermined number of consecutive successful transmissions. Hence, a network station can avoid capturing a network channel while ensuring access latencies.

26 Claims, 6 Drawing Sheets

SYSTEM FOR SELECTIVELY REDUCING CAPTURE EFFECT IN A NETWORK STATION BY INCREASING DELAY TIME AFTER A PREDETERMINED NUMBER OF CONSECUTIVE SUCCESSFUL TRANSMISSIONS

FIELD OF THE INVENTION

The present invention relates to network interfacing and more particularly, to methods and systems efficiently accessing Ethernet media.

DESCRIPTION OF THE RELATED ART

Local area networks use a network cable or other media to link stations on the network. Each local area network architecture uses a media access control (MAC) enabling network interface cards at each station to share access to the media.

The Ethernet protocol ISO/IEC 8802-3 (ANSI/IEEE Std. 802.3, 1993 edition) defines a half-duplex media access mechanism that permits all stations to access the network channel with equality. Each station includes an Ethernet interface card that uses carrier-sense multiple-access with collision detection (CSMA/CD) to listen for traffic on the media. Transmission by a station begins after sensing a deassertion of a receive carrier on the media, indicating no network traffic. After starting transmission, a transmitting station will monitor the media to determine if there has been a collision due to another station sending data at the same time. If a collision is detected, both stations stop, wait a random amount of time, and retry transmission.

Any station can attempt to contend for the channel by waiting a predetermined transmission delay interval after the deassertion of the receive carrier on the media, known as the interpacket gap (IPG) interval. If a plurality of stations have data to send on the network, each of the stations will attempt to transmit in response to the sensed deassertion of the receive carrier on the media and after the IPG interval, resulting in a collision.

Ethernet networks mediate collisions by using a truncated binary exponential backoff (TBEB) algorithm, which provides a controlled pseudorandom mechanism to enforce a collision backoff interval before retransmission is attempted. According to the truncated binary exponential backoff algorithm, a station keeps track of the number of transmission attempts (j) during the transmission of a current frame. The station computes a collision backoff interval as a randomized integer multiple of a slot time interval, and attempts retransmission after the collision backoff interval. The station will attempt to transmit under the truncated binary exponential algorithm a maximum of sixteen times.

The collision backoff interval is calculated by selecting a random number of time slots from the range of zero to $2^j-1$. For example, if the number of attempts j=3, then the range of randomly selected time slots is (0.7); if the randomly-selected number of time slots is four, then the collision backoff interval will be equal to four slot time intervals. According to Ethernet protocol, the maximum range of randomly selected time slots is $2^{10}-1$.

The truncated binary exponential algorithm has the disadvantage that the range of randomly selected time slots (0, $2^j-1$) increases exponentially each time a specific station loses a retry attempt after collision, resulting in a higher probability that during the next collision mediation the station will randomly select a larger integer multiple of time slots and lose the next collision mediation. Thus, a new station that has data to transmit has a higher probability of winning a collision mediation than the station having a greater number of attempts. This effect is known as the capture effect, where a new station in the collision mediation effectively has a greater probability of capturing access to the media than the losing station until the maximum number of attempts has been reached.

Hence, collision-based networks having collision mediation require each colliding station to back off a random number of slot times, dependent on the number of attempts, before reattempting access to the medium. Such collision mediation reduces the network throughput and creates unbounded packet access latencies. Consequently, applications requiring bounded access latencies such as interactive multimedia cannot be supported on half-duplex networks.

The capture effect also may occur between Ethernet/IEEE 802.3 network stations having different capabilities in counting the transmission delay interval before attempting access of the media. Ethernet protocol specifies the transmission delay interval after sensed deassertion of the receive carrier, i.e., the interpacket gap (IPG) interval, as having a minimum value before stations can attempt access of the media. Network stations (i.e., network nodes) that are capable of minimizing the transmission delay to the IPG interval, referred to as "fast nodes" or "dominant stations", will begin to transmit before stations incapable of achieving the minimum IPG interval, referred to as "slow nodes". In other words, hardware limitations may prevent the slow nodes from accessing the media within the time interval defined by the IPG interval. Hence, dominant network stations will tend to capture the media over slower nodes that wait a longer time before attempting access of the media.

The capture effect may also occur due to the position of a network station within a network topology. For example, if two stations are connected to a router at different distances, the one station closer to the router will have less of a propagation delay, enabling that one station to capture the media. Hence, the station further from the router will suffer a "surrender effect", incapable of accessing the media.

Hence, capture effect may be caused by a station encountering a large number of collisions, variance in IPG access times between fast and slow nodes, and variations in propagation delay. The capture effect thus causes a large variance in the network access latency, and a corresponding large variance in end to end delays experienced by data packets.

DISCLOSURE OF THE INVENTION

There is a need for a method of accessing media of an Ethernet network that increases the throughput of the Ethernet network under heavy traffic loads.

There is also a need for a method of accessing media of an Ethernet network that minimizes the occurrence of the capture effect.

There is also a need for an arrangement for accessing the media of a half-duplex shared network that provides bounded packet access latencies.

There is also a need for a method of accessing media of a shared network, where network stations having minimal propagation delays or an ability to access the media after the minimum interpacket gap (IPG) interval do not capture the media from other network stations.

There is also a need for a method of accessing media of a shared network, where stations capturing the media are able to selectively release control of the media to other network stations.

These and other needs are attained by the present invention, where the delay time between sensing a deassertion of the receive carrier on the media and attempting access of the media is modulated in a network station based on the number of successful consecutive transmissions completed by the network station.

According to one aspect of the present invention, a method of accessing network media by a network station includes the steps of determining if a number of consecutive successful transmissions by the network station exceeds a predetermined threshold, setting a delay time to include a predetermined interpacket gap interval and an additional time interval if the number exceeds the predetermined threshold, sensing deassertion of a receive carrier on the media, waiting the delay time in response to the sensed deassertion of the receive carrier, and attempting access of the media by the network station after the sensed deassertion of the receive carrier and the delay time. The setting of the delay time to include an additional time interval when the number of consecutive successful transmissions exceeding a predetermined threshold enables a network station that has captured a media channel to effectively release the channel for access by slower network stations.

One particular feature of the above-described method maintains the delay time at the additional time interval for a predetermined deferral interval, enabling the network station to reset the delay time to the predetermined interpacket gap interval and limit the latency encountered by the network station during the deferral interval. Another particular feature of the above-described method adds a second additional time interval to the delay time if the number of consecutive transmissions exceeds a second threshold, enabling the network station to dynamically adjust the delay time based on the relative performance with other stations.

Another aspect of the present invention provides a network interface for connection with media of a network, comprising a carrier sensor sensing deassertion of a carrier on the media, a programmable timer counting a programmable delay interval in response to the sensed deassertion of the carrier, the predetermined delay interval having a value of at least a predetermined interpacket gap interval, a transmitter outputting a data packet onto the media in response to a determined absence of activity by the sensor during the programmable delay interval, and a controller selectively increasing the programmable delay interval from the predetermined interpacket gap interval in response to the transmitter outputting a first predetermined number of consecutive successful transmissions. Hence, the controller selectively adjusts the programmable delay interval to minimize the channel capture by the network station while ensuring access latencies.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

Reference is made to the attached drawings, wherein elements having the same reference numeral designations represent like elements throughout and wherein.

BEST MODE FOR CARRYING OUT THE INVENTION

Figure 1:
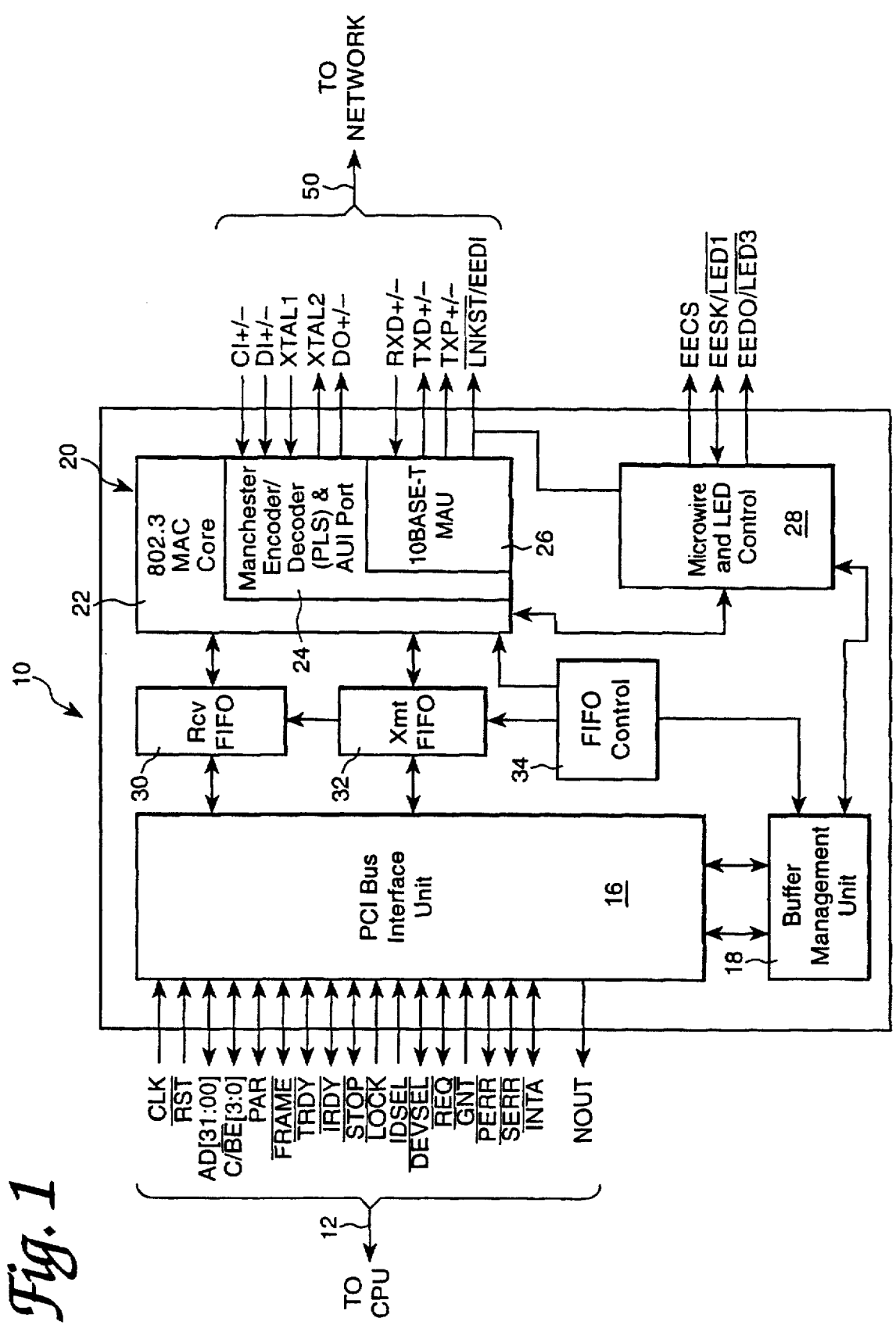
FIG. 1 is a block diagram of a network interface according to an embodiment of the present invention.

FIG. 1 is a block diagram of an exemplary network interface 10 that accesses the media of an Ethernet (ANSI/IEEE 802.3) network according to an embodiment of the present invention, resulting in avoidance of capture effect, increased throughput on the network during heavy traffic, and no collisions.

The network interface 10, preferably a single-chip, 32-bit Ethernet controller, provides an interface between a local bus 12 of a computer, for example, a peripheral component interconnect (PCI) local bus, and an Ethernet-based media 50. An exemplary network interface is the commercially available Am79C970 PCnet™-PCI Single-Chip Ethernet Controller for PCI Local Bus from Advanced Micro Devices, Inc., Sunnyvale, Calif., disclosed on pages 1-868 to 1-1033 of the AMD Ethernet/IEEE 802.3 Family 1994 World Network Data Book/Handbook, the disclosure of which is incorporated in its entirety by reference.

The interface 10 includes a PCI bus interface unit 16, a direct memory access (DMA) buffer management unit 18, and a network interface portion 20 including a media access control (MAC) core 22, an attachment unit interface (AUI) 24, and a twisted-pair transceiver media attachment unit (10BASE-T MAU) 26. The AUI port 24 follows the specification ISO/IEC 8802-3 (IEEE-ANSI 802.3). The interface 10 also includes a microwire EEPROM interface 28, a receive first in first out (FIFO) buffer 30, a transmit FIFO buffer 32, and a FIFO controller 34.

The PCI bus interface unit 16, compliant with the PCI local bus specification (revision 2.1), receives data frames from a host computer's CPU via the PCI bus 12. The PCI bus interface unit 16, under the control of the DMA buffer management unit 18, receives DMA and burst transfers from the CPU via the PCI bus 12. The data frames received from the PCI bus interface unit 16 are passed on a byte-by-byte basis to the transmit FIFO 32.

The buffer management unit 18 manages the reception of the data by the PCI bus interface unit 16 and retrieves information from header bytes that are transmitted at the beginning of transmissions from the CPU via the PCI bus 12. The header information identifying the byte length of the received frame is passed to the FIFO control 34.

The Manchester encoder and attachment unit interface (AUI) 24 includes a Collision In (CI+/−) differential input pair, operating at pseudo ECL levels, that signals to the network interface 10 when a collision has been detected on the network media. A collision occurs when the CI inputs are driven with a 10 MHz pattern of sufficient amplitude and pulse width that meets the ISO/IEC 8802-3 (ANSI/IEEE 802.3) standards. The Data Out (DO+/−) output pair of the AUI 24 transmits Manchester encoded data at pseudo ECL levels onto the network media 50. Similarly, the twisted pair interface 26 includes 10BASE-T port differential receivers (RXD+/−) and 10BASE-T port differential drivers (TXD+/−).

The media access control (MAC) 20 performs the CSMA/CD functions in response to signals from the interfaces 24 or 26. For example, carrier sense is detected by the DI and RXD signal paths of the AUI port 24 and MAU 26, respectively. The AUI 24 and the MAU 26 each include a physical layer that senses idle to nonidle transitions on the media 50, as specified in Ethernet (ANSI/IEEE 802.3) protocol. The detection of activity on the media 50 is performed by the physical layer, which asserts a valid receive data indication to the MAC 20 layer in response to the detection and decoding of the preamble of a received data packet. Hence, the term activity on the media refers to reception of valid data. The sensed deassertion of the receive carrier occurs when the physical layer determines that the media 50 transitions from a nonidle to an idle state. The AUI 24 detects a collision by the CI inputs, and the MAU 26 detects a collision by sensing activity on both twisted pair signals RXD and TXD.

Figure 2:
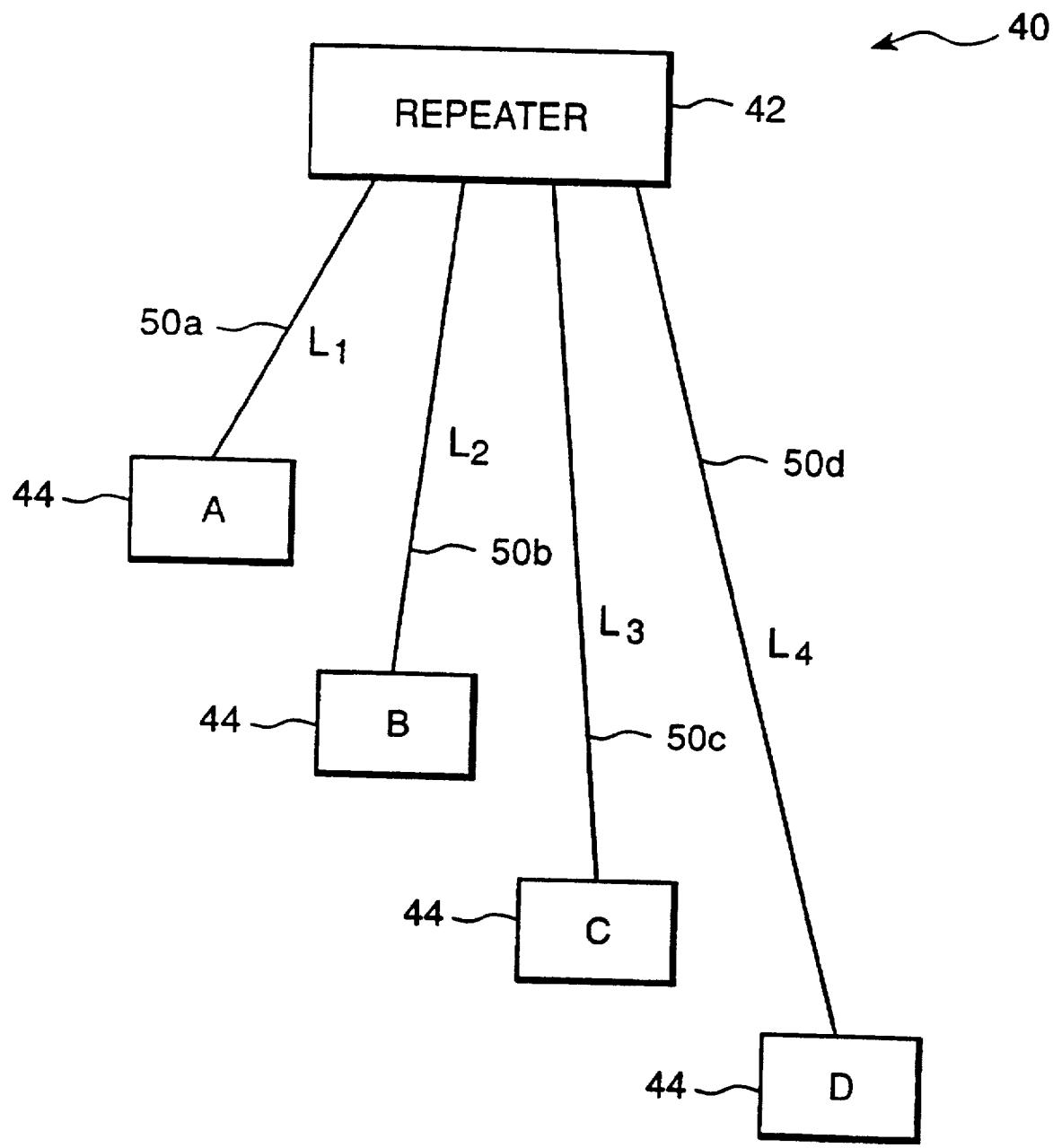
FIG. 2 is a diagram illustrating a layout of an Ethernet network.

FIG. 2 is a diagram illustrating a network 40 having a repeater 42 connecting four network stations 44 by the media 50. The media 50 may be either coaxial, fiber optic, or twisted pair wire, and hence may couple the interface 10 to 10BASE-T, 10BASE-2, 100BASE-TX, 100BASE-T4, or 100BASE-FX networks. The network 40 may operate at 10 megabits per second (10 Mbit/s), 100 megabits per second (100 Mbit/s), or 1000 megabits per second (1000 Mbit/s). The station A is connected to the repeater 42 by media cable 50a having a length L1, and the remaining stations B, C, and D are connected to the repeater 42 by cables 50b, 50c, and 50d having respective lengths L2, L3, and L4.

As shown in FIG. 2, the cables have relative lengths L1<L2<L3<L4. Hence, station A has the lowest propagation delay for signals sent and received by the repeater 42, and station D has the highest propagation delay. The minimal propagation delay (L1) provides station A the advantage of sensing deassertion of a receive carrier on the media 50a before the stations B, C, and D sense the deassertion on the respective media cables 50b, 50c, and 50d. Since station A encounters the minimum propagation delay, station A has the greatest probability of capturing the media channel if all stations operate at equal access speeds. Station A may have an additional advantage if it can access the media with an interframe spacing (IFS) equal to the minimum IPG, whereas the other stations B, C, and D have hardware limitations that result in an IFS longer than the minimum IPG before accessing the media. Hence, station A is considered the dominant station, or the fast node, because it has the greatest probability of capturing the media channel.

The disclosed embodiments minimize the capture effect by temporarily reprogramming in the dominant station the delay timer to wait an IFS interval greater than the predetermined interpacket gap (IPG) interval when the dominant station has successfully transmitted a predetermined consecutive number of data packets. Resetting the delay time results in a larger interframe spacing in the dominant station, enabling other stations to access the media. The disclosed embodiments also provide bounded access latencies by resetting the IFS delay intervals to the minimum IPG after a predetermined deferral interval. Examples of applications requiring bounded access latencies include multimedia applications transporting video and audio data in real time or near-real time.

Figure 3:
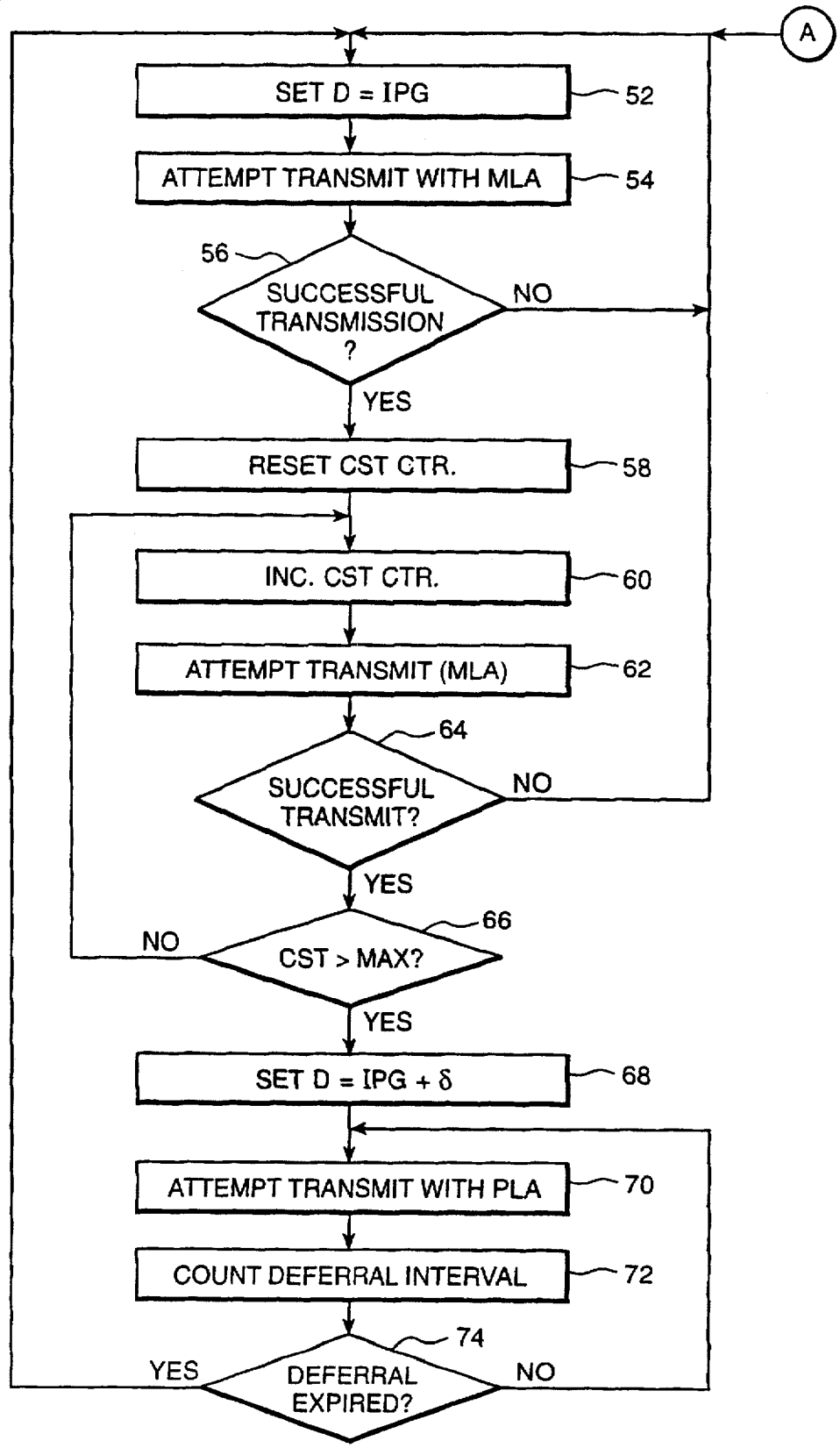
FIG. 3 is a flow diagram of the method for accessing media of a network according to an embodiment of the present invention.

FIG. 3 is a flow diagram illustrating the method of accessing the media 50 of an Ethernet network. The disclosed method can be implemented by embedding executable code within a memory element in the MAC 22 (e.g., register, EPROM, EEPROM, flash memory). The MAC 22 begins by setting a programmable delay timer (D) to have an IFS delay interval equal to predetermined interpacket gap (IPG) interval, specified by Ethernet (ANSI/IEEE 802.3) protocol. The predetermined interpacket gap interval (IPG) is defined as 96 bit times for 10 megabit per second, 100 megabit per second, and 1000 megabit per second networks.

Setting the delay timer (D) to equal the minimum IPG establishes a minimum latency access (MLA) mode in the network station. In other words, the MLA mode is defined as the attempt by the MAC 22 to transmit data on the medium using the minimum allowed interframe spacing specified by the delay timer (D), namely D =IPG. The MAC 22 then attempts to transmit data packets on the media in step 54 using the minimum latency access (MLA) mode. The step of attempting to transmit data on the media 50 is described in more detail below with respect to FIG. 5.

If the MAC 22 determines in step 56 that the transmission attempt in step 54 was not successful, the MAC 22 returns to step 52 to retry transmission attempts in the MLA mode. If transmission was successful, the MAC 22 resets in step 58 a consecutive successful transmission (CST) counter that monitors the number of consecutive packets successfully transmitted by the MAC 22.

After the CST counter is reset in step 58, The MAC 22 increments the CST counter in step 60 to record the successful transmission from step 54. The MAC 22 then attempts to transmit another data packet in step 62 according to the MLA mode. After attempting transmission in step 62, the MAC 22 checks in step 64 if the transmission attempt was successful. If the MAC 22 determines the transmission attempt was not successful, the MAC 22 returns to step 52. Otherwise, if the MAC 22 was successful in transmission, the MAC 22 checks in step 66 whether the CST counter exceeds a predetermined threshold that defines the number of consecutive successful transmissions necessary for a station to capture the media channel. If the MAC 22 determines in step 66 that the CST counter does not exceed predetermined threshold (MAX), the MAC 22 returns to step 60 to increment the CST counter after the last successful transmission.

If the MAC 22 determines in step 66 that the CST counter exceeds the threshold (MAX), the MAC 22 sets the delay time (D) to include the predetermined interpacket gap interval (IPG) plus an additional time interval ($\delta$) in step 68. The value $\delta$ is based on the maximum round trip delay between two stations, defined as a slot time ($t_s$), where $2\delta > t_s$. A slot time ($t_s$) is defined as 512 bit times for 10 MB/s and 100 MB/s networks. Hence, the delay $2\delta$ has a duration of greater than 51.2 microseconds and 5.12 microseconds in 10 megabit per second and 100 megabit per second networks, respectively. The value $2\delta$ has a preferred value of greater than 4096 bit times for 1000 megabit per second networks, although other values may be used consistent with the network topology and propagation characteristics.

Hence, the MAC 22 in step 68 sets the programmable delay timer to a value D=IPG+$\delta$, where the delay ($\delta$) preferably has a duration greater than one-half the slot time. The increased value in the delay timer establishes a programmed latency access (PLA) mode for the network station, where the network station increases the interframe spacing (IFS) interval between data packets. Hence, the PLA mode enables other stations on the network to access the media, thereby reducing the capture effect of the network station having performed a successful number of transmits greater than the threshold for a captured channel (MAX). Hence, other nodes that were previously deferring to this dominant node will now have an opportunity to access the channel.

The MAC 22 then attempts to transmit on the network media in step 70 using the PLA mode in step 70. The MAC 22 simultaneously begins monitoring the deferral interval of the PLA mode in order to limit the latency experienced by the MAC 22.

Figure 4A:
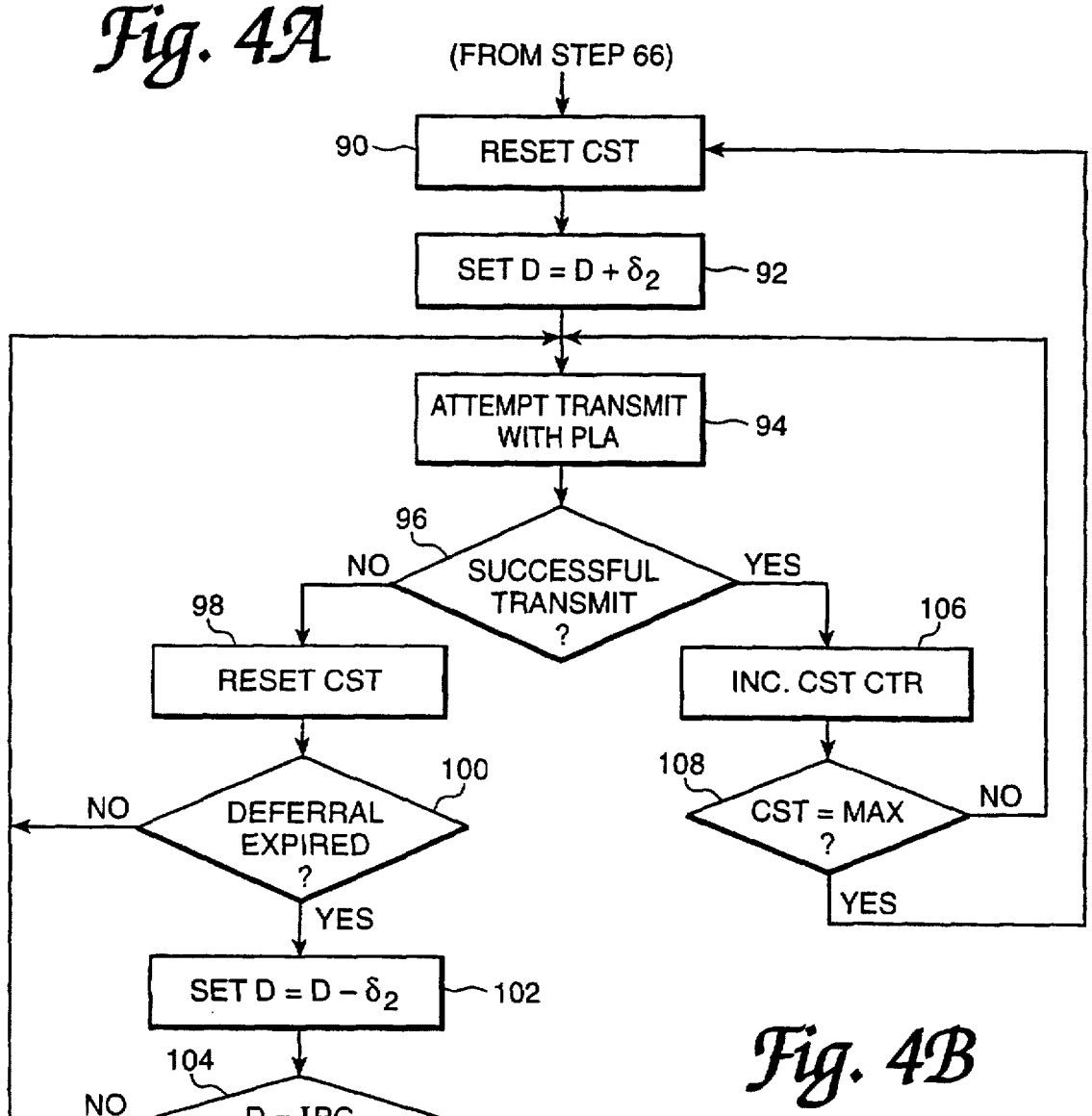
FIGS. 4A, 4B and 4C are flow diagrams illustrating variations in the method of FIG. 3.
Figure 4B:
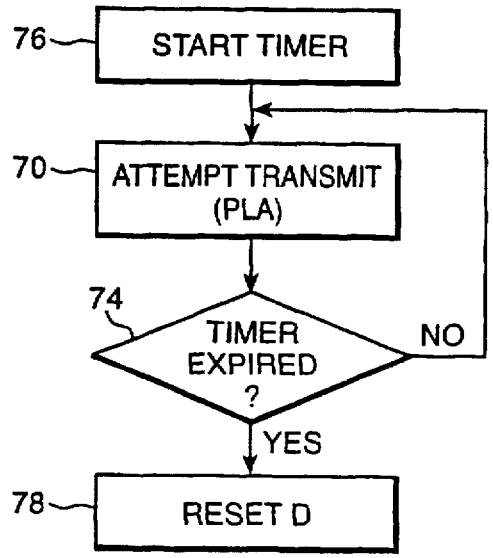
Figure 4C:
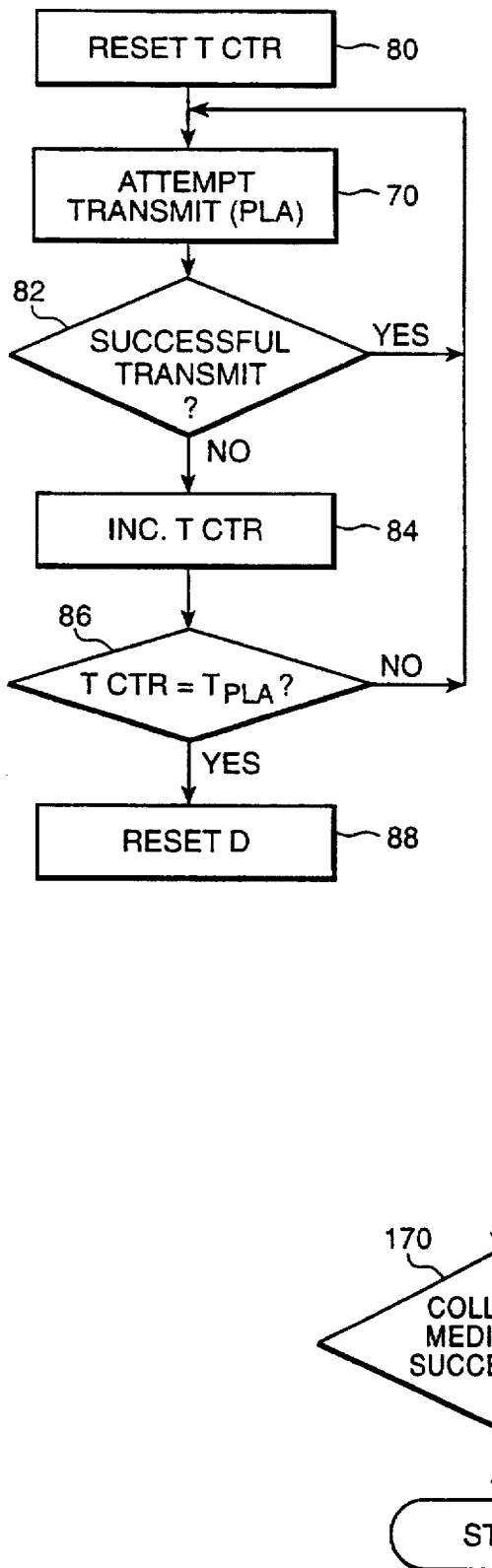

FIGS. 4B and 4C are flow diagrams illustrating different methods of monitoring the deferral interval during which time the MAC 22 operates in the PLA mode. FIG. 4B illustrates monitoring the predetermined deferral interval as a predetermined time interval that limits the amount of time the MAC 22 operates according to the PLA mode. FIG. 4C monitors the predetermined deferral interval by counting the number of successful transfers by other network stations as detected on the media.

As shown in FIG. 4B, the MAC 22 starts a deferral timer in step 76, also referred to as a deferral monitor, simultaneously with the setting of the delay time in step 68. The MAC 22 then continues with attempting to transmit data in the PLA mode in step 70. The MAC 22 checks after each transmission attempt in step 74 whether the deferral timer has expired, for example, whether the timer has reached a predetermined interval ($t_{PLA}$). If the MAC 22 determines that the deferral timer has not expired, then additional transmission attempts are repeated in step 70 using the PLA mode. If the timer has expired in step 74, the delay timer (D) is reset to the minimum IPG in step 78. Hence, the deferral timer identifies a reduced throughput time interval of the network station, and enables the reduced throughput of the PLA mode to have a limited duration in order to guarantee access latency in the network station.

FIG. 4C discloses an alternate method of monitoring the predetermined deferral interval based on the number of successful transmissions by other network stations. The monitoring of the deferral interval begins by resetting a transmit (T) counter in step 80, also referred to generally as the deferral monitor, which monitors the number of successful transmissions by other network stations. The MAC 22 then attempts transmission using the PLA mode in step 70, enabling other network stations the opportunity to access the media channel. The MAC 22 then checks whether transmission was successful in step 82. If the MAC 22 determines that transmission was successful, then the MAC 22 attempts to transmit another data packet using the PLA mode. However, if the MAC 22 was not successful in transmitting the data packet, the transmission counter is incremented in step 84, indicating that another network station was successful in transmitting a data packet. The MAC 22 then checks in step 86 whether the transmission counter equals a predetermined number of data transfers by other network stations ($T_{PLA}$). If the predetermined number has not been reached, the MAC 22 returns to step 70 to continue transmission attempts using the PLA mode. However, if the transmission counter equals the predetermined number in step 86, the delay timer is reset in step 88 to the minimum IPG interval.

Hence, the network station remains in the programmed latency access (PLA) mode for a predetermined deferral interval, monitored by either a programmable timer or a programmable counter. Once the network station has operated in the reduced-throughput PLA mode for the duration of the deferral interval, defined by the time interval ($t_{PLA}$) or the number of transmissions ($T_{PLA}$), the network station returns to the minimum latency access (MLA) mode, where the delay timer is reset to the minimum IPG interval.

FIG. 4A is a variation of the programmed latency access (PLA) mode of FIG. 3, where the network station may repeatedly increment the delay timer by a predetermined delay interval ($\delta_2$). In this case, the value of the delay interval ($\delta_2$) need not necessarily be greater than one-half the slot time ($t_s$) Hence, the method of FIG. 4A enables a network station to "hunt" for the appropriate interframe spacing (IFS) by increasing the programmable delay (D) by the delay interval ($\delta_2$) after every programmable number of consecutive successful transfers (CST). Hence, the method of FIG. 4A ensures that the network station can successfully defer to nodes that need a large interframe spacing (IFS) between transfers.

As shown in FIG. 4A, the MAC 22 begins the dynamic adjustment of the IFS after step 66 of FIG. 3 by resetting the CST counter in step 90 to zero. After resetting the CST counter, the MAC 22 increments the delay timer (D) in step 92 by the programmable delay ($\delta_2$). After resetting the programmable delay (D), the MAC 22 attempts transmission according to the PLA mode in step 94, which corresponds to step 70 of FIG. 3. After attempting transmission in step 94, the MAC 22 determines in step 96 whether transmission was successful. If transmission was not successful by the network station, the CST counter is reset in step 98, and the MAC 22 checks whether the deferral interval has expired in step 100 using one of the counting techniques illustrated in FIGS. 4B and 4C. If the deferral interval has not expired in step 100, the MAC 22 retries transmission in step 94. However, if the deferral interval has expired, the delay timer (D) is reset in step 102 by decrementing the delay timer by the programmable value ($\delta_2$). If the programmable timer is set to the minimum IPG value in step 104, the method returns to the initial minimum latency access (MLA) mode, shown in FIG. 3.

If in step 96 the MAC 22 determines that transmission was successful, the CST counter is incremented in step 106. If the MAC 22 determines in step 108 that the CST counter has reached the predetermined threshold (MAX) indicating capture of the media channel, the CST counter is reset in step 90 and the delay timer (D) is incremented with another delay in step 92 ($\delta_2$) to further increase the interframe spacing between transfers by the network station. Hence, the method of FIG. 4A enables the MAC 22 to automatically tune for any variance in the IFS capabilities of nodes that share the medium. At the same time, the MAC 22 maintains the deferral interval for a limited time to ensure access latencies stay within a maximum bound.

Figure 5:
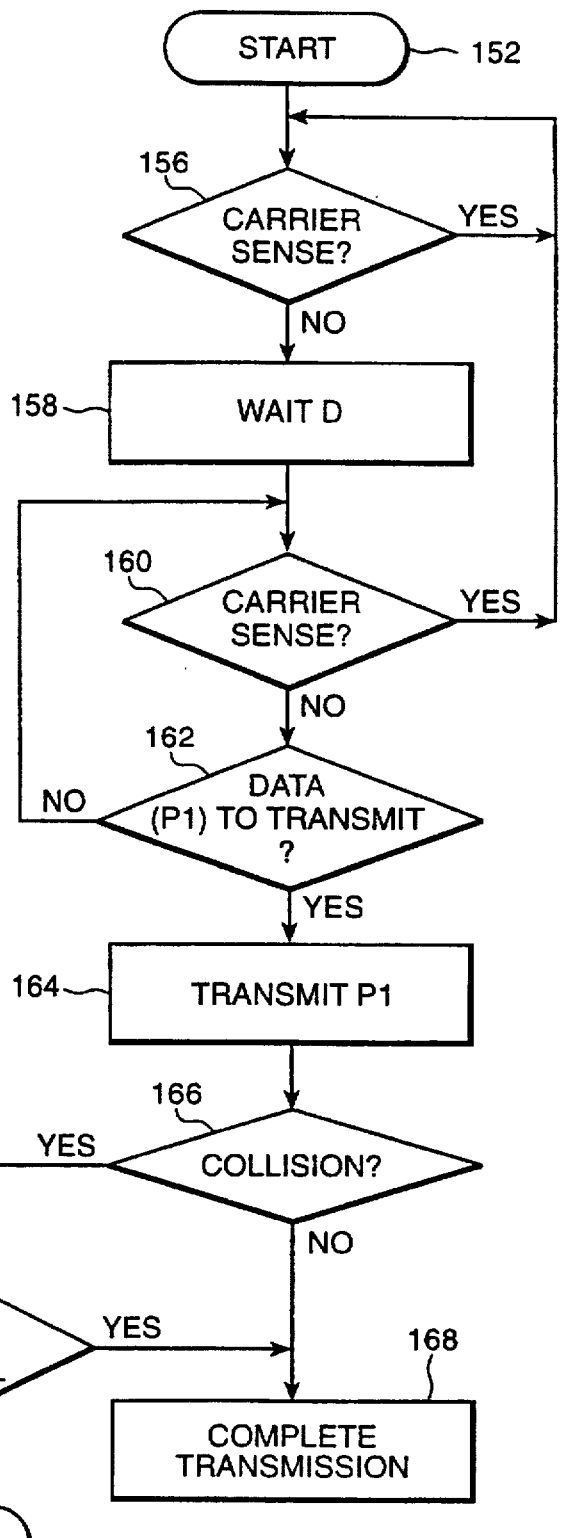
FIG. 5 is a flow diagram illustrating in detail the steps of attempting to transmit a data packet onto the media.

FIG. 5 is a diagram illustrating in detail the attempt by the MAC 22 to attempt access of the media, for example in steps 54, 62, 70, and 94. The media access controller (MAC) 22 in the network interface 10 starts in step 152, during which point the Ethernet media 50 is busy with transmission activity by a station. The MAC 22 then checks in step 156 if a receive carrier is sensed on the media 50 using the CSMA/CD, indicating that the network is busy. If the receive carrier is sensed, the MAC 22 waits in step 156 until deassertion of the receive carrier on the media 50 is detected. The MAC 22 starts the delay timer in step 158 in response to the sensed deassertion of the receive carrier, which causes the MAC 22 to wait the programmed delay time (D). As described above, the delay timer (D) in the MLA mode waits the minimum IPG interval of 9.6 microseconds (As) for a 10 Mbit/s network and 0.96 μs for a 100 Mbit/s network. A similar IPG interval can be provided for a 1000 Mbit/s network.

While waiting the programmed delay time (D), the MAC 22 checks in step 160 if the carrier is detected on the media 50. If a carrier is detected in step 160, the MAC 22 returns to the wait state in step 156, causing the delay timer to be reset to the programmed delay time (D). If no carrier is detected during the delay interval, the MAC 22 checks in step 162 whether the transmit FIFO 32 has a data packet (P1) to send. If the transmit FIFO 32 has data to send, the MAC 22 begins to transmit the data packet in step 164.

After transmission has begun in step 164, the MAC 22 checks in step 166 to determine whether a collision has been detected. If no collision is detected in step 166, the transmission of the data packet is completed in step 168.

If a collision is detected in step 66, the MAC 22 performs collision mediation, for example using the truncated binary exponential backoff (TBEB) algorithm. If the MAC 22 determines in step 170 that the collision mediation is successful, the transmission is completed in step 168. If collision mediation is not successful, the data packet is discarded.

Figure 6:
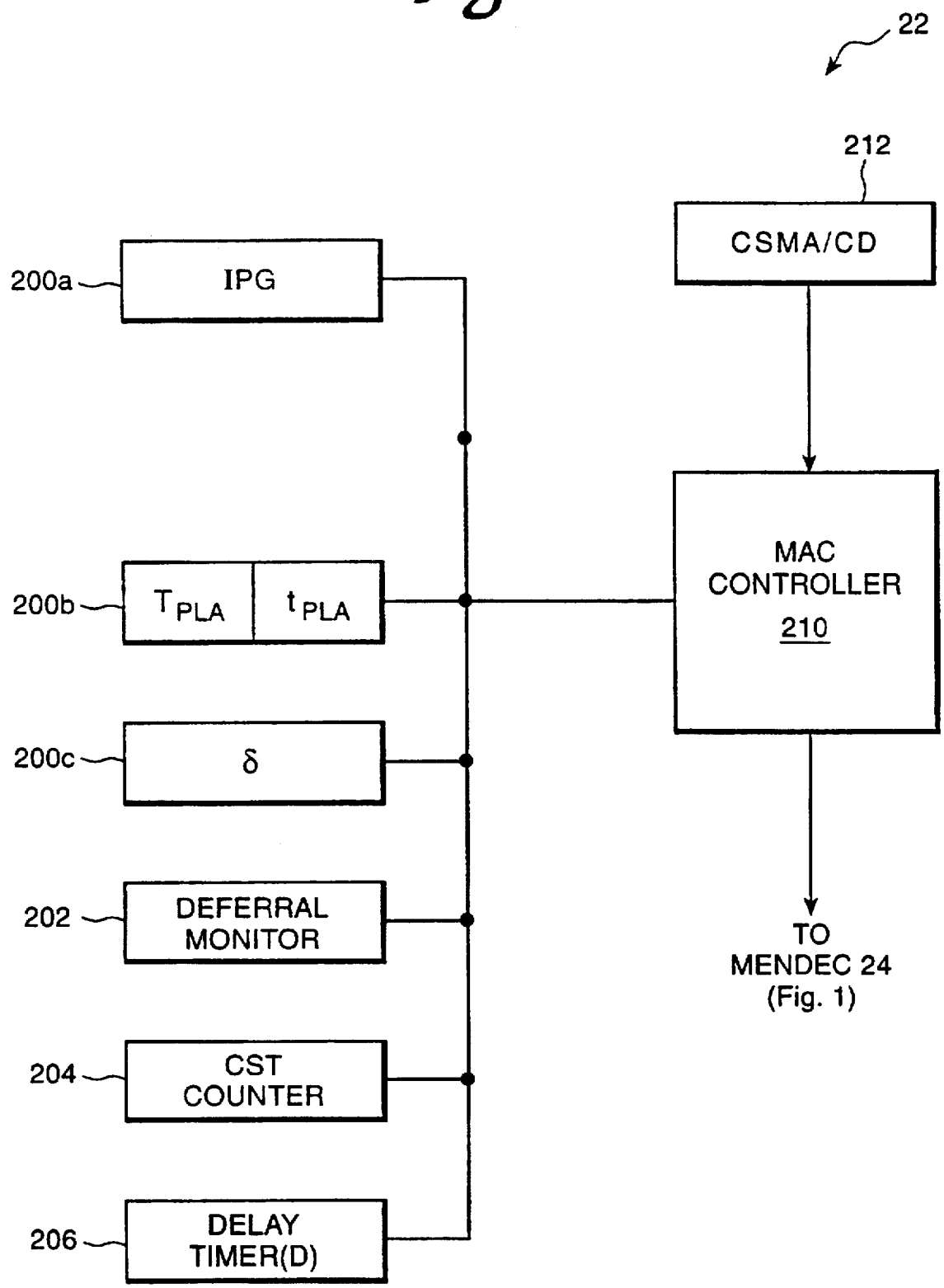
FIG. 6 is a block diagram of the media access control (MAC) of FIG. 1.

FIG. 6 is a block diagram illustrating the functional components of the MAC 22. The media access control 22 include registers 200a, 200b and 200c storing the minimum IPG value, the predetermined deferral intervals $T_{PLA}$ and $t_{PLA}$, and the delay interval 6, respectively. The MAC 22 also includes the deferral monitor 202 that monitors the duration of the PLA mode based upon the predetermined interval stored in register 200b, a CST counter 204, and the programmable delay timer (D) 206.

The MAC controller 210 starts the appropriate delay timer 206 in response to a signal from the CSMA/CD 212 indicating that deassertion of the receive carrier on the media has been sensed. The MAC controller 210 sends an instruction to the Manchester encoder/decoder 24 to attempt access of the media after the delay timer 206 has reached the programmable delay time.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

We claim:

1. In a network station coupled to media of a network, a method of accessing the media, comprising:

determining if a number of consecutive successful transmissions by the network station exceeds a predetermined threshold;

if the number exceeds the predetermined threshold, setting a delay time including a predetermined interpacket gap interval and an additional time interval;

sensing deassertion of a receive carrier on the media;

waiting the delay time in response to the sensed deassertion of the receive carrier; and attempting access of the media by the network station after the sensed deassertion of the receive carrier and the delay time.

2. The method of claim 1, wherein the attempting access step comprises:

sensing whether a receive carrier is asserted on the media during the waiting step; and transmitting a data packet if the receive carrier is not asserted on the media during the waiting step.

3. The method of claim 2, further comprising setting the delay time to the predetermined interpacket gap interval if the number is less than or equal to the predetermined threshold.

4. The method of claim 1, wherein said setting step comprises maintaining the delay time equal to said predetermined interpacket gap plus the additional time interval for a predetermined deferral interval.

5. The method of claim 4, wherein said predetermined deferral interval corresponds to a predetermined time interval.

6. The method of claim 5, wherein maintaining step comprises starting a timer in response to the setting of said delay time, the timer identifying a reduced throughput time interval of the network station.

7. The method of claim 6, further comprising resetting the delay time to equal the predetermined interpacket gap interval after the timer has counted the reduced throughput time interval.

8. The method of claim 4, wherein said predetermined deferral interval corresponds to a predetermined number of data transfers having occurred on the medium by other network stations.

9. The method of claim 8, wherein the maintaining step comprises:

resetting a deferral counter in response to the setting of said delay time; and incrementing the deferral counter in response to each detected successful transfer on the media by another network station.

10. The method of claim 9, further comprising resetting the delay time to equal the predetermined interpacket gap interval in response to the deferral counter having counted said predetermined number of data transfers.

11. The method of claim 1, wherein said additional time interval has a duration greater than one half a network slot time.

12. The method of claim 1, wherein said additional time interval has a duration less than one half a network slot time, the method further comprising:

determining whether a second number of consecutive transmissions by the network station after the setting step exceeds a second predetermined threshold;

if the second number exceeds the second predetermined threshold, repeating said setting step by adding a second additional time interval to said delay time.

13. The method of claim 12, wherein said setting step comprises maintaining the delay time including said second additional delay time for a predetermined deferral interval.

14. The method of claim 13, further comprising resetting the delay time, after the predetermined deferral interval, to the predetermined interpacket gap interval plus the additional time interval.

15. The method of claim 12, wherein said predetermined deferral interval corresponds to a predetermined time interval.

16. The method of claim 12, wherein said predetermined deferral interval corresponds to a predetermined number of data transfers having occurred on the medium by other network stations.

17. The method of claim 16, further comprising resetting the delay time to the predetermined interpacket gap interval plus the additional time interval in response to detection of said predetermined number of data transfers having occurred by other network stations.

18. The method of claim 1, wherein the network is a CSMA/CD network, the predetermined interpacket gap interval equal to ninety six (96) bit times and the additional time interval greater than one half a network slot time.

19. The method of claim 1, wherein the network slot time equals at least five hundred twelve (512) bit times.

20. The method of claim 18, wherein the network has a data rate of 1000 megabits per second and the predetermined slot time is approximately four thousand ninety six (4096) bit times.

21. A network interface for connection with media of a network, comprising:

a carrier sensor sensing deassertion of a carrier on the media;

a programmable timer counting a programmable delay interval in response to the sensed deassertion of said carrier, the predetermined delay interval having a value of at least a predetermined interpacket gap interval;

a transmitter outputting a data packet onto the media in response to a determined absence of activity by said sensor during the programmable delay interval; and a controller selectively increasing the programmable delay interval from the predetermined interpacket gap interval in response to the transmitter outputting a first predetermined number of consecutive successful transmissions.

22. The interface of claim 21, further comprising a counter counting the number of said consecutive successful transmissions by the transmitter.

23. The interface of claim 22, further comprising a deferral monitor counting a deferral interval in response to the increase in the programmable delay interval, the controller selectively adjusting the programmable delay interval in response to the deferral monitor counting a predetermined deferral level.

24. The interface of claim 23, wherein the deferral monitor counts to the predetermined deferral level corresponding to a predetermined time interval.

25. The interface of claim 23, wherein the deferral monitor counts a number of data transfers having occurred on the media by other network stations, the predetermined deferral level corresponding to a predetermined number of said data transfers by the other network stations.

26. The interface of claim 21, wherein the controller increases the programmable delay by a first delay interval in response to said first predetermined number of consecutive successful transmissions, the controller further increasing the programmable delay by a second delay interval in response to the transmitter outputting a second predetermined number of consecutive successful transmissions greater than the first predetermined number.

* * * * *